(12) United States Patent
Kumar et al.

(10) Patent No.: US 10,567,953 B1
(45) Date of Patent: Feb. 18, 2020

(54) SYSTEM AND METHOD FOR UPDATING A STATUS INFORMATION OF A NON-ACTIVE SIM

(71) Applicant: RELIANCE JIO INFOCOMM LIMITED, Mumbai (IN)

(72) Inventors: Ranjit Kumar, Jabalpur (IN); Ulhas Dattaram Parab, Navi Mumbai (IN); Nikhil V. Ghadge, Mumbai (IN); Amol Madhukar Kadam, Dombivli (IN); Sagar Tayal, Dombivli (IN)

(73) Assignee: RELIANCE JIO INFOCOMM LIMITED, Mumbai (IN)

( * ) Notice: Subject to any disclaimer, the term of this patent is extended or adjusted under 35 U.S.C. 154(b) by 0 days.

(21) Appl. No.: 16/344,076

(22) PCT Filed: Oct. 23, 2017

(86) PCT No.: PCT/IB2017/056560
§ 371 (c)(1),
(2) Date: Apr. 23, 2019

(87) PCT Pub. No.: WO2018/078503
PCT Pub. Date: May 3, 2018

(30) Foreign Application Priority Data

Oct. 24, 2016 (IN) .............................. 201621036376

(51) Int. Cl.
*H04B 1/38* (2015.01)
*H04W 8/18* (2009.01)
(Continued)

(52) U.S. Cl.
CPC ............. *H04W 8/183* (2013.01); *H04W 4/16* (2013.01); *H04W 48/18* (2013.01);
(Continued)

(58) Field of Classification Search
CPC ......... H04W 8/183; H04W 4/14; H04W 4/16; H04W 60/005; H04W 76/15; H04W 88/06; H04B 1/3816
See application file for complete search history.

(56) References Cited

U.S. PATENT DOCUMENTS 8,385,893 B2   2/2013   Gupta et al.
9,066,330 B2   6/2015   Hang et al.
(Continued)

OTHER PUBLICATIONS

International Search Report dated Feb. 5, 2018 from Authorized Officer, Hitendra Sharma.

*Primary Examiner* — Tuan Pham
(74) *Attorney, Agent, or Firm* — Hunton Andrews Kurth LLP

(57) ABSTRACT

Embodiments of the present disclosure may relate to a system and method for updating a status information of a first SIM [112A] and a second SIM [112B] of a user equipment [110] at a network entity [140]. In a preferred embodiment, the system [100] comprising: the network entity [140] configured to receive and/or initiate a first voice call from the first SIM [112A]; and the user equipment [110] configured to allocate a radio resource to the second SIM [112B] for transmitting the status information to the network entity [140]; allocate the radio resource to the first SIM [112A] for availing the first voice call; and re-allocate the radio resource to the second SIM [112B] for transmitting the status information (indicating availability of the second SIM [112B]) to the network entity [140] the user equipment [110] in an event the voice connection on the first SIM [102A] is disconnected.

13 Claims, 7 Drawing Sheets

(51) Int. Cl.
*H04W 88/06* (2009.01)
*H04W 4/16* (2009.01)
*H04W 48/18* (2009.01)
*H04W 76/15* (2018.01)
*H04W 60/00* (2009.01)

(52) U.S. Cl.
CPC ......... *H04W 60/005* (2013.01); *H04W 76/15* (2018.02); *H04W 88/06* (2013.01)

(56) References Cited

U.S. PATENT DOCUMENTS

| | | | | |
|---|---|---|---|---|
| 2014/0295831 | A1* | 10/2014 | Karra | H04W 68/005 455/434 |
| 2016/0029199 | A1* | 1/2016 | Shi | H04B 1/3816 455/432.1 |
| 2017/0289889 | A1* | 10/2017 | Sahu | H04L 43/0888 |

* cited by examiner

SYSTEM AND METHOD FOR UPDATING A STATUS INFORMATION OF A NON-ACTIVE SIM

TECHNICAL FIELD

Embodiments of the present disclosure generally relate to wireless communication networks and supplementary services associated therein. More particularly, embodiments of the present disclosure relate to a system and a method for updating a status information of a non-active SIM at a network entity.

BACKGROUND

In recent years, multi-SIM wireless devices ecosystems have undergone tremendous growth and commercialisation because of the adaptability and capability of said multi-SIM wireless devices for providing voice as well as data services simultaneously, particularly in the countries having multiple service providers. For instance, smart phones having more than one SIM (i.e. multi-SIM), enables a user to implement different plans and/or service providers in a single smart phone, wherein each different plan and/or service provider may be availed via individual and separate mobile number. Further, the multi-SIM wireless devices allows the users to pay local call rates in targeted destination country/zones located outside the operating zones/countries, by using a new SIM while travelling outside the operating zones/countries. Also, the users may be facilitated by different pricing plans for data and/or voice services. Therefore, the multi-SIM wireless devices may be considered as a dual-purpose device that enables the users to effectively avail the voice and data services via multiple SIMs without any need to carry multiple separate devices.

Moreover, the devices have been evolved from a single SIM solution/technology to a multi-SIM solution/technology. Therefore, the recent developments in said technology have enabled the users to switch between multi-SIMs by deploying solutions to make dual-SIM devices configured for Dual SIM Dual Standby (DSDS) operation. Currently, there are mainly two variants in dual SIM devices i.e. Dual SIM Dual Active (DSDA) and Dual SIM Dual Standby (DSDS). Particularly, in the Dual SIM Dual Active (DSDA) devices, the user equipment may be facilitated with radio transmitter/receiver circuits (herein after referred as radio resources) for enabling the users to initiate and/or receive voice/data call/s on a second SIM while there is a session on-going on the first SIM. Thus, in the DSDA devices, typically two radio transmitter/receiver circuits may be present to allow both the SIMs to be active at the same time, thereby enabling simultaneous independent communications through both the SIMs. On the other hand, in the DSDS devices, independent communications may not be enabled through both the SIMs. Although, the DSDA devices provide better connectivity by ensuring that both the SIMs are active, however, said DSDA devices poses several disadvantages due to high battery drain out, higher radiation and other complications.

Consequently, considering the majority of the user equipments enabled with DSDS ecosystems along with additional advantages of higher battery life, less radiation and lesser complications, there exists several known solutions for improving said DSDS devices. However, the existing solutions relating to the DSDS devices poses certain issues/limitations, inter alia, degradation of a Network KPI and poor quality user experience. Another limitation of said DSDS devices lies in the confusion created to a calling device/user. For instance, in the DSDS ecosystem, two SIMs, a first SIM and a second SIM may be inserted in available SIM slots of the DSDS device (i.e. the user equipment enabled with DSDS ecosystem), wherein the first SIM may have a VoLTE connectivity and the second SIM may have a CS connectivity or vice versa. Further, in this case, if the user has an ongoing voice call from the first SIM, then the other SIM i.e. second SIM will be out of service or no service. So in an event, a third party attempts to call on the second SIM, the user may receive an IVR demonstrating that the number on the second SIM may be out of coverage area/switched off, thereby giving a false impression to the calling device/user and misleading the user that the second SIM user/subscriber is out of coverage/switched off. Thus, the call on the second SIM may be not be recognised by the DSDS device. Also, in the same instance, the DSDS device face another challenge of increased network bugs and network failures due to the ongoing call on the second SIM due to which identification of such issues may not be not known. Thus, the network/base station may not be aware of the real bug/s and reason/s behind the failure of connection on the second SIM in the event of ongoing connection on the first SIM.

Accordingly, in order to overcome the aforementioned problems inherent in the existing solutions for enhancing DSDS devices and notifying the bugs and causes behind any failure of connection through one of the two SIMs of a user equipment, there exists a need of an efficient mechanism to update a status information of the SIM/s of the user equipment, wherein the status information may indicate one of unavailability and availability of one of the two SIM for receiving a voice call in the event of the ongoing connection on the other SIM.

SUMMARY

This section is provided to introduce certain objects and aspects of the present disclosure in a simplified form that are further described below in the detailed description. This summary is not intended to identify the key features or the scope of the claimed subject matter.

Embodiments of the present disclosure may relate to a method for updating a status information of a first SIM and a second SIM of a user equipment at a network entity, the method comprising: one of receiving and initiating, by the network entity, a first voice call from the first SIM, wherein the first SIM and the second SIM have one of an active data session and a passive data session, and the first SIM and the second SIM are in an ideal state; suspending, by the user equipment, a data session of the second SIM in an event the second SIM is in the active data session; allocating, by the user equipment, a radio resource to the second SIM for transmitting the status information to the network entity, wherein the status information indicates unavailability of the second SIM for receiving a second voice call; allocating, by the user equipment, the radio resource to the first SIM for establishing a voice connection for availing the first voice call, wherein the first SIM is in an active state and the second SIM is in a passive state; and allocating, by the user equipment, the radio resource to the second SIM for transmitting the status information to the network entity, wherein the radio resource is allocated to the second SIM in an event the voice connection on the first SIM is disconnected, the status information indicates availability of the second SIM for receiving the second voice call, and the first SIM and the second SIM are in the ideal state.

Further, the embodiments of the present disclosure encompass a system for updating a status information of a first SIM and a second SIM of a user equipment at the network entity, the system comprising: the network entity configured to one of receive and initiate a first voice call from the first SIM, wherein the first SIM and the second SIM have one of an active data session and a passive data session, and the first SIM and the second SIM are in an ideal state; the user equipment configured to: suspend a data session of the second SIM in an event the second SIM is in the active data session; allocate a radio resource to the second SIM for transmitting the status information to the network entity, wherein the status information indicates unavailability of the second SIM for receiving a second voice call; allocate the radio resource to the first SIM for establishing a voice connection for availing the first voice call, wherein the first SIM is in an active state and the second SIM is in a passive state; and allocate the radio resource to the second SIM for transmitting the status information to the network entity, wherein the radio resource is allocated to the second SIM in an event the voice connection on the first SIM is disconnected, the status information indicates availability of the second SIM for receiving the second voice call, and the first SIM and the second SIM are in the ideal state.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
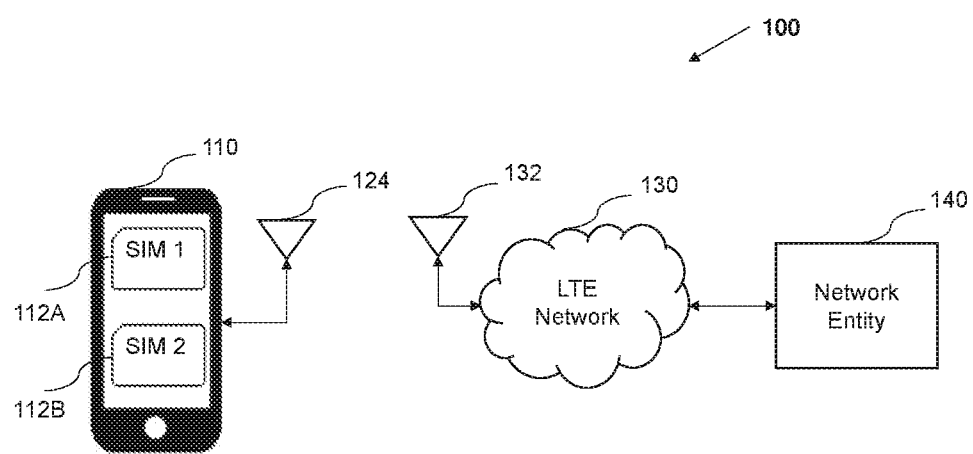
FIG. 1 illustrates a system architecture [100] for updating a status information at a network entity, in accordance with an embodiment of the present disclosure.

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Example embodiments of the present disclosure are described below, as illustrated in various drawings in which like reference numerals refer to the same parts throughout the different drawings.

Embodiments of the present disclosure may relate to a system and method for updating a status information of a first SIM (Subscriber Identity Module) and a second SIM (Subscriber Identity Module) of a user equipment, wherein the status information indicates one of an availability and un-availability of at least one of the first SIM and the second SIM. The system comprises the network entity and the user equipment, wherein the user equipment and the network entity communicate to each other through a network, wherein the network may be a LTE network in an embodiment. The network entity either receives or initiates a first voice call from the first SIM, wherein the first SIM and the second SIM have one of an active data session and a passive data session, and also, the first SIM and the second SIM may be in an ideal state. Further, the user equipment suspends a data session of the second SIM in an event of the active data session on the second SIM, pursuant to which the user equipment allocates a radio resource to the second SIM for transmitting the status information to the network entity indicating the unavailability of the second SIM for receiving a second voice call. Subsequently, the radio resource may again be allocated to the first SIM for establishing a voice connection for availing the first voice call, wherein the first SIM may be now in an active state and the second SIM may be in a passive state. Finally, once the voice connection on the first SIM is disconnected, the user equipment allocates the radio resource to the second SIM for transmitting the status information to the network entity that now indicates the availability of the second SIM for receiving the second voice call.

The "network entity" as used herein may comprise of one or more components of a IMS network, wherein said components may include, but not limited to, an input unit, a deciding module, a processing module and a storage unit. The network entity may refer to one of an eNodeB, a Base Transceiver Station (BTS), Base Station Controller (BSC) and a Radio Network Controller (RNC). Further, the network entity may communicate to the user equipment through the LTE (Long Term Evolution) network.

The "user equipment" as used herein may include, but not limited to, a smart phone, a feature phone, a tablet, a phablet and any such device obvious to a person skilled in the art. Further, the user equipment may comprise an input means such as a keyboard, an operating system, a memory unit, a display interface, etc. More particularly, the user equipment comprises at least two SIMs for availing the data and voice services. Also, the user equipment is the dual SIM dual standby (DSDS) communication device. In the DSDS devices, when the third party (another user equipment) attempts to call on the first SIM in an event the user has an ongoing voice call on the second SIM, then the third party may receive a false impression demonstrating that the number on the first SIM may be out of coverage area/switched off.

The "active data session" as used herein may refer to a mode in which the user equipment may receive data packets from the network entity. Therefore, the user equipment, when in the active data session, may continue to receive data packets (and/or services) from the network entity.

The "passive data session" as used herein may refer to a mode in which the user equipment may not receive data packets from the network entity.

The "ideal state" as used herein may refer to a mode in which the first SIM and the second SIM may be capable of receiving one of the first voice call and the second voice call.

The "active state" as used herein may indicate an ongoing voice call between the SIM (the first SIM or the second SIM) and the network/third party.

The "passive state" as used herein may indicate no ongoing voice call and incapability of the SIM (the first SIM or the second SIM) to receive any voice call.

The "radio resource" as used herein may refer to RF circuitry resources available in the DSDS devices.

Figure 2:
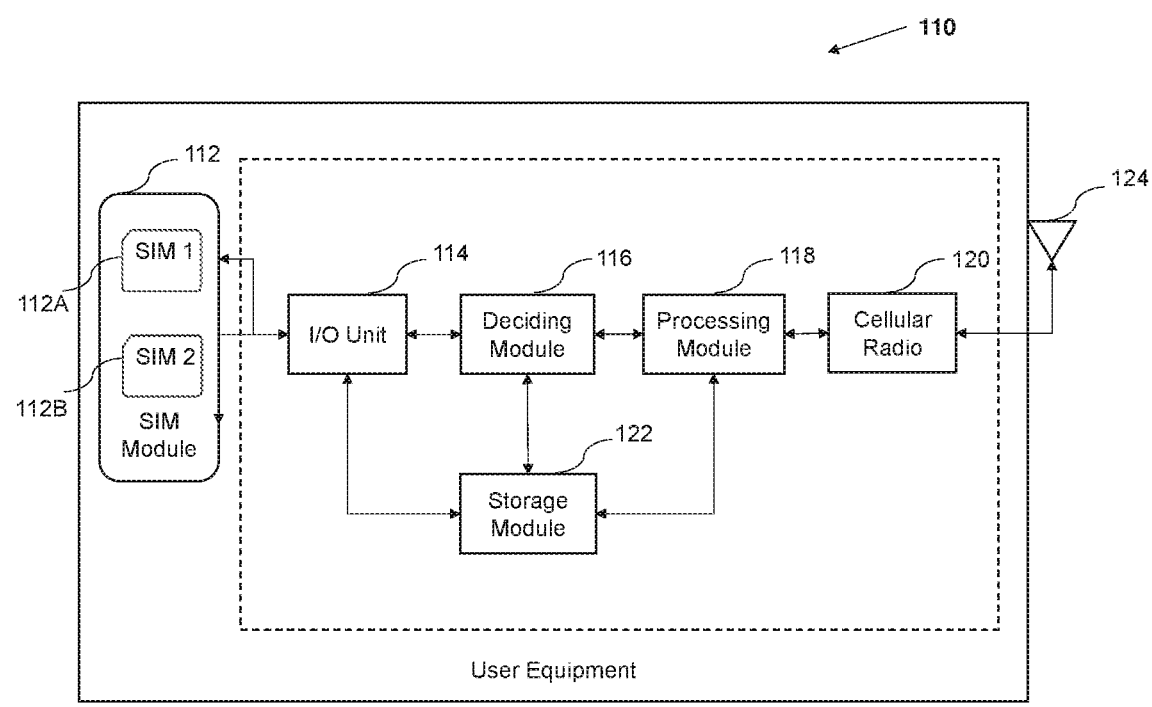
FIG. 2 illustrates an exemplary system architecture of a user equipment for updating a status information at a network entity, in accordance with an embodiment of the present disclosure.
Figure 3:
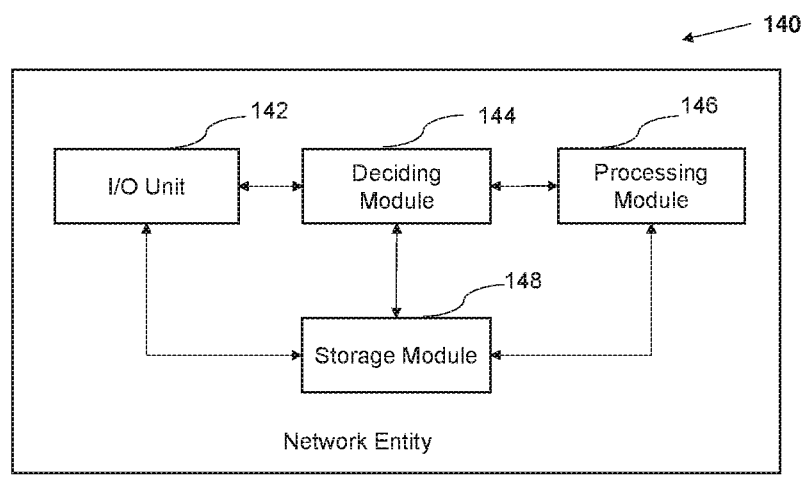
FIG. 3 illustrates an exemplary system architecture of a network entity for updating a status information at a network entity, in accordance with an embodiment of the present disclosure.

As illustrated in FIG. 1, FIG. 2 and FIG. 3, the present disclosure encompasses a system comprising a user equipment [110], a LTE network [130] and a network entity [140] in accordance with an embodiment of the present disclosure. Further, the network entity [140] comprises an I/O (input/output) unit [142], a deciding module [144], a processing module [146] and a storage module [148]. The user equipment [110] comprises a SIM module [112], an I/O unit (input/output) [114], a deciding module [116], a processing module [118], a storage module [122] and a cellular radio [120] connected with an antenna [124], wherein the SIM module [112] comprises a first SIM [112A] and a second SIM [112B]. The two available SIM may be connected to the network entity [140] through the LTE network [130], wherein the LTE network [130] may communicate with the two available SIMs via an antenna [132]. In an embodiment, the first SIM [112A] may have a CS connectivity and the second SIM [112B] may have a VoLTE connectivity, while in an alternate embodiment, the first SIM [112A] may have the VoLTE connectivity and the second SIM [112B] may have the CS connectivity. More particularly and as illustrated in said FIG. 1, FIG. 2 and FIG. 3, the second SIM [112B] and the first SIM [112A] may be in the idle state and the first SIM [112A] and the second SIM [112B] may have one of the active data session and the passive data session. Additionally, the first SIM [112A] and second SIM [112B] may initially be registered at the network for a registration refresh expiry time. In an embodiment, when both the SIMs (the first SIM [112A] and second SIM [112B]) are registered at the network, the deciding module [116] of the user equipment [110] may check priority of the SIMs (the first SIM [112A] and second SIM [112B]), pursuant to which the processing module [118] of the user equipment [110] may allocate the radio resource to one of the SIMs (the first SIM [112A] and second SIM [112B]) based on said priority.

Further, in a preferred embodiment, the I/O unit [114] of the user equipment [110] may be configured to transmit the paging messages/instructions to the first SIM [112A], wherein the first SIM [112A] may be configured to periodically receive paging messages/instructions for one of initiating and receiving the first voice call. The "paging" as used herein may refer to a one-to-one communication between the user equipment [110] and the network entity [140], wherein the paging may be typically used in order to identify a subscriber's location before establishing a call or may be used to alert the mobile station of an incoming call. Prior to the transmission of the paging instructions, the I/O unit [142] of the network entity [140] may be configured to one of receive and initiate the first voice call from one of the first SIM [112A] and the second SIM [112B].

Further, the deciding module [116] of the user equipment [110] may be configured to suspend the data session of the second SIM [112B] in an event the second SIM [112B] is in the active data session. Said deciding module [116] may include, but not limited to, a software module incorporated in a modem. In an embodiment, said deciding module [116] may also be configured to process the paging messages/instructions by inducing a time delay for enabling the allocation of the radio resources to the second SIM [112B], wherein the second SIM [112B] may now be connected to the network entity [140] while the first SIM [112A] for now, may not be connected to the network entity [140] for the specific time delay. In an exemplary embodiment, a pause expiry timer may be pre-defined for a call according to the user/operator's requirements, wherein the pause expiry timer may refer to the duration for which incoming call may not be allowed for second SIM at Network entity. Also, the pause expiry timer may be greater than the registration refresh expiry time. Here, in said embodiment, the registration refresh expiry time may be extended by a received value as pause expiry from the user equipment [110], by the network entity [140]. After the expiry of the registration refresh expiry time, the network entity [140] may delete an IMS registration context of the second SIM [112B], thereby enabling the user equipment [110] to initiate a fresh registration after the completion of the registration refresh expiry time; however, if the call on the first SIM [112A] is disconnected before the registration refresh expiry time, the second SIM [112B] may be available for the second voice call. In another embodiment, the pause expiry timer may be lesser than the registration refresh expiry time, the network entity [140] may not override the registration refresh expiry time; however, after the expiry of the pause expiry timer, the network entity [140] may delete the IMS registration context of the second SIM [112B], thereby enabling the user equipment [110] to initiate a fresh registration after the completion of the pause expiry timer. In another embodiment, the pause expiry timer may be equal to the registration refresh expiry time i.e. the pause expiry timer and the registration refresh expiry time may end at same time, the user equipment [110] may initiate a fresh registration. Furthermore, the deciding module [144] of the network entity [140] may be configured to take decision of handling the IMS registration context of the user with respect to at least one of the pause expiry timer, the SIP PAUSE command and the SIP RESUME command.

Thereafter, the processing module [118] of the user equipment [110] may now allocate the radio resources to the second SIM [112B] for transmitting the status information of the second SIM [112B] to the network entity [140], wherein the status information may indicate unavailability of the second SIM [112B] for receiving the second voice call. In an embodiment, the status information may comprise a SIP PAUSE command and therefore, the network entity [140] may be aware of unavailability of the second SIM [112B].

In an exemplary embodiment, the SIP PAUSE command may be transmitted and implemented in the following format/code:

PAUSE sip:XXX SIP/2.0
    Via: SIP/2.0/UDP ABC.com;branch=XXX
    Max-Forwards: XX
    To: <sip:XYZ.com>10
    From: ABC <sip:ABC.com>;tag=YYY
    Call-ID: XYZ
    CSeq: YY
    Contact: sip:ABC.com
    User-Agent:ABC 15
    Accept: application/sdp
    Content-Length: XX
    Expires:XX Further, said processing module [118] may re-allocate the radio resources to the first SIM [112A] (earlier allotted to the second SIM [112B]) for establishing the voice connection for availing the first voice call, wherein the first SIM [112A] may be in the active state and the second SIM [112B] may be in the passive state. Finally, in the event the voice connection on the first SIM [112A] is disconnected, said processing module [118] may be configured to allocate the radio resource to the second SIM [112B] for again transmitting the status information of the second SIM [112B] to the network entity [140], wherein the status information may now indicate availability of the second SIM [112B] for receiving the second voice call. In an embodiment, the status information may comprise a SIP RESUME command and therefore, the network entity [140] may be aware of the availability of the second SIM [112B] and that the second SIM [112B] may now be enabled to initiate or receive the second voice call through the second SIM [112B]. In an exemplary embodiment, the SIP RESUME command may be transmitted and implemented in the following format/code:

RESUME sip:XXX SIP/2.0 20
    Via: SIP/2.0/TCP ABC.com;branch=XXX
    Max-Forwards: XX
    To: <sip:XYZ.com>
    From: ABC <sip: ABC.com>;tag=YYY
    Call-ID: XYZ 25
    CSeq: YY
    Contact: sip:ABC.com
    User-Agent:ABC
    Accept: application/sdp
    Content-Length: XX Thus, both the SIMs i.e. the first SIM [112A] and the second SIM [112B] may again be in the ideal state. In an embodiment, the I/O unit [142] of the network entity may be configured to receive the status information from the I/O unit [114] of the user equipment [110]. Also, the present invention encompasses allocating of the radio resource to the first SIM [112A] and the second SIM [112B] for a pre-defined time period. Further, on receiving the status information (indicating availability of the second SIM [102B] for receiving the second voice call) from the user equipment [110], the processing module [146] of the network entity [140] may be configured to transmit an acknowledging status.

Further, at least one of the storage module [122] of the user equipment [110] and the storage module [148] of the network entity [140] may be configured to store and update the status information of the first SIM [112A] and the second SIM [112B] of the user equipment [110]. The storage module [122], [148] may include, but not limited to, a volatile memory, non-volatile memory, a remote storage, a cloud storage, high-speed random access memory and/or non-volatile memory, such as one or more magnetic disk storage devices, one or more optical storage devices, and/or flash memory (e.g., NAND, NOR) or a combination thereof.

Further, the cellular radio [120] of the user equipment [110] may be connected to the antenna [124] for receiving and transmitting communication signals as encompassed by the present invention. The cellular radio [120] may be selected from a wide range of frequency bands such as 800 MHz, 900 MHz, 1800 MHz, 2100 MHz, 2300 MHz, etc.

Figure 4:
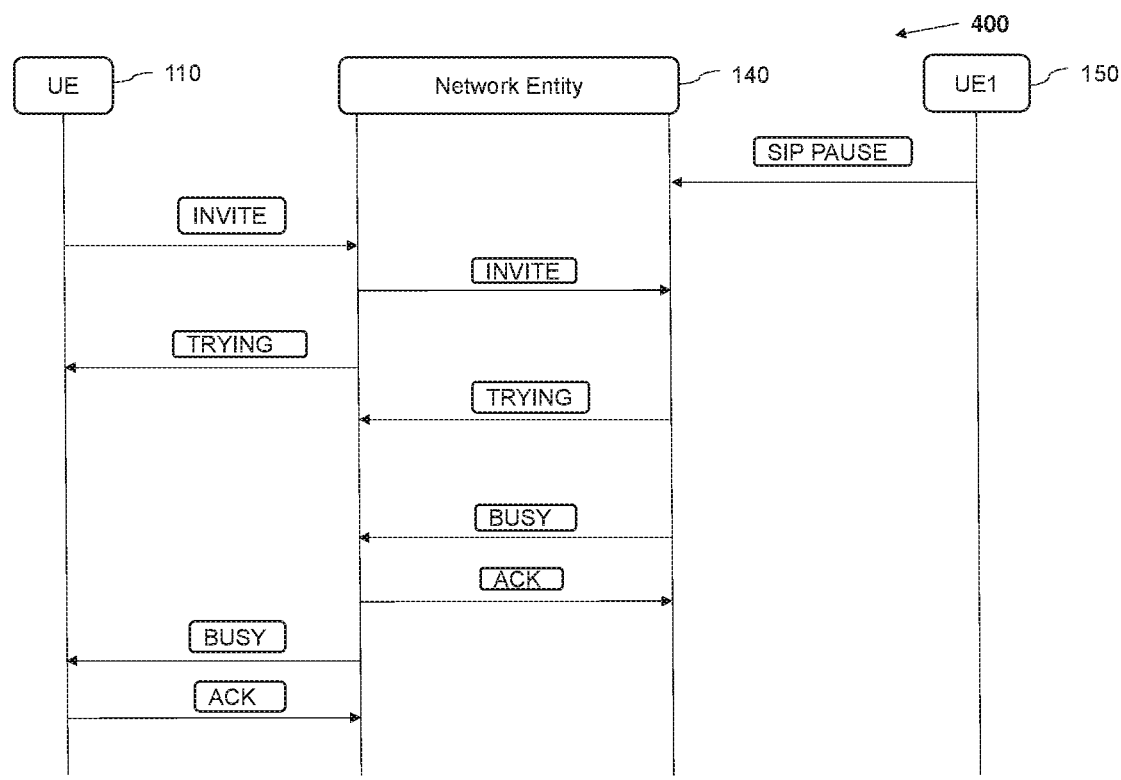
FIG. 4 illustrates an exemplary signalling diagram [400] relating to a call session for updating the status information (indicating unavailability of the second SIM) at the network entity, in accordance with an embodiment of the present disclosure.

FIG. 4 illustrates an exemplary signalling diagram [400] relating to a call session for updating the status information (indicating unavailability of the second SIM [112B]) at the network entity [140], in accordance with an embodiment of the present disclosure. More particularly and as illustrated in said FIG. 4, user equipment UE 1 [150] may be the DSDS device comprising at least two SIMs (the first SIM [112A] and the second SIM [112B]), wherein the first SIM [112A] and the second SIM [112B] may have two different LTE networks [130] and/or network entities [140] considering the first SIM [112A] and the second SIM [112B] belong to two different service providers. In said FIG. 4, the UE 1 [150] may transmit the SIP PAUSE command to the corresponding network entity [140] of the second SIM [112B] of the UE 1 [150] indicating the unavailability of the second SIM [112B] of the UE 1 [150] in an event of the on-going voice call on the first SIM [112A] of the UE 1 [150]. Further, in the course of the ongoing voice call on the first SIM [112A] of the UE 1 [150], the UE [110] attempts to connect to the UE 1 [150] by transmitting an 'INVITE' message to the corresponding network entity [140] of the first SIM [112A] of the UE [110] and further to the corresponding network entity [140] of the second SIM [112B] of the UE 1 [150]. However, the network entity [140] may not further connect to the second SIM [112B] of the UE 1 [150] based on the SIP PAUSE command (indicating unavailability of the second SIM [112B]) until the corresponding network entity [140] updates the SIP PAUSE command from the UE 1 [150]. Further, the network entity [140] informs the UE [110] by transmitting a 'BUSY' message. Furthermore, the ACK message may be transmitted by the UE [150] to the network entity [140] in response to the 'BUSY' message. In an embodiment, the UE [110] may continue to attempt to connect to the UE 1 [150] till the event the UE [110] receives the ACK message from the network entity [140], thereby increasing the signalling load for the UE [110] due to the continuous failed attempts.

Figure 5:
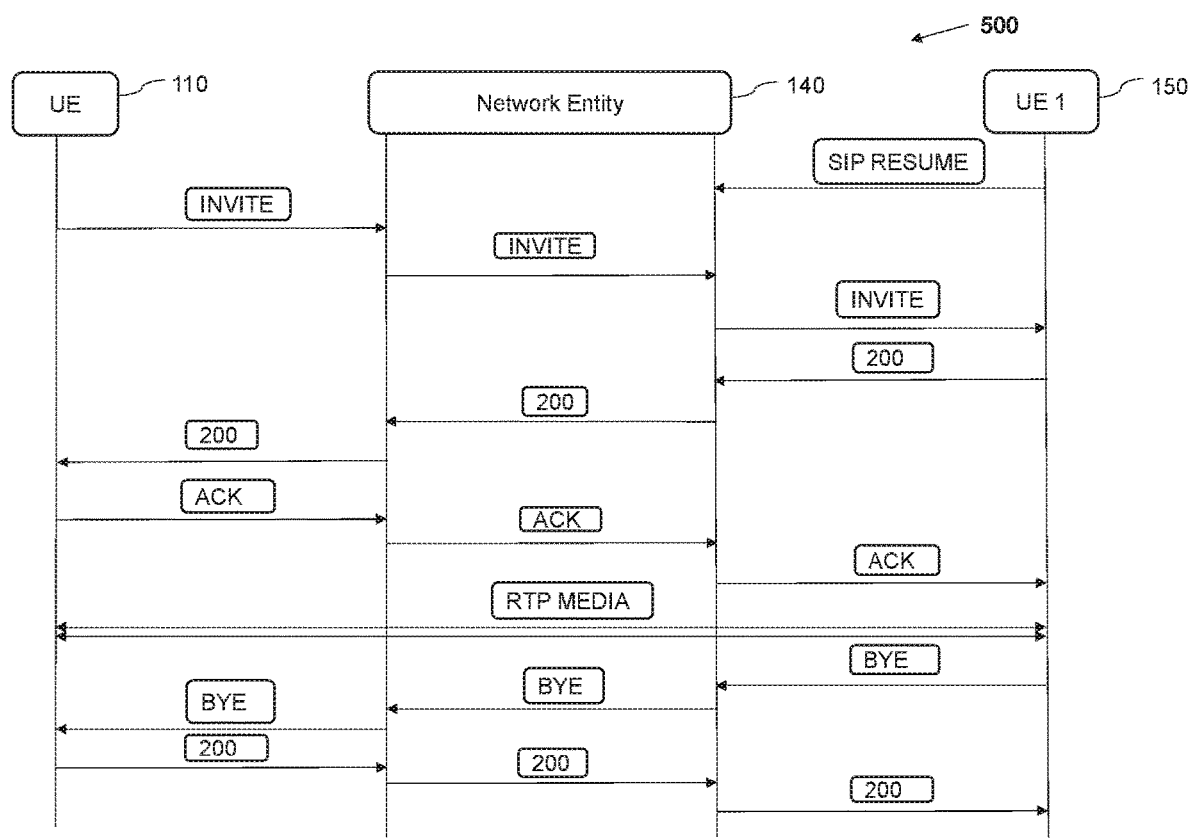
FIG. 5 illustrates an exemplary signalling diagram [500] relating to a call session for updating the status information (indicating availability of the second SIM) at the network entity, in accordance with an embodiment of the present disclosure.

Furthermore, FIG. 5 illustrates an exemplary signalling diagram [500] relating to a call session for updating the status information (indicating availability of the second SIM [112B]) at the network entity [140], in accordance with an embodiment of the present disclosure. As illustrated in said FIG. 5, pursuant to disconnection of the voice call on the first SIM [112A] of the UE 1 [150], the UE 1 [150] may transmit the SIP RESUME message to the corresponding network entity [140] of the second SIM [112B] of the UE 1 [150] indicating the availability of the second SIM [112B] of the UE 1 [150]. In an event pursuant to disconnection of the voice call on the first SIM [112A] of the UE 1 [150], the UE [110] attempts to connect to the UE 1 [150] by transmitting an 'INVITE' message to the network entity [140] of the first SIM [112A] of the UE [110] and further to the corresponding network entity [140] of the second SIM [112B] of the UE 1 [150]. Further, 200 OK may be transmitted by UE 1 [150] on receiving the INVITE message for voice call connection intended to second SIM [112B]. Furthermore, the ACK message may be transmitted by the UE [110] to the corresponding network entity [140] of the first SIM [112A] of the UE [110] and further to the corresponding network entity [140] of the second SIM [112B] of the UE 1 [150]. Also, the UE 1 [150] may transmit a 'BYE' message to the UE [110] through the network entity [140] of the second SIM [112B] of the UE 1 [150] and the network entity [140] of the first SIM [112A] of the UE [110], pursuant to which the UE [110] may now again transmit the 'ACK' message to the UE 1 [150] through the network entity [140] of the first SIM [112A] of the UE [110] and the network entity [140] of the second SIM [112B] of the UE 1 [150]. In an embodiment, the communication between the UE [110] and the UE 1 [150] may be facilitated using a RTP (Real-time Transport Protocol) media (a network protocol used for availing data and audio services).

Figure 6:
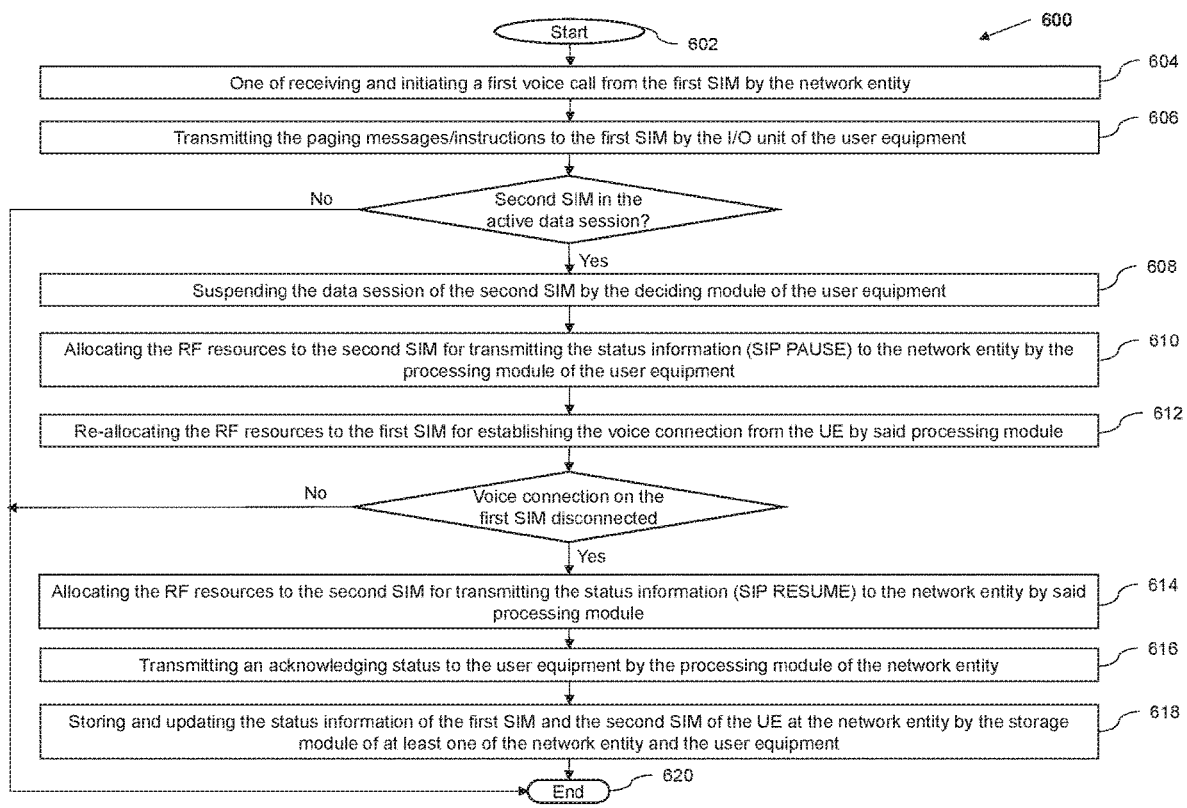
FIG. 6 illustrates an exemplary method flow diagram [600] for updating the status information of the first SIM and the second SIM of the user equipment, in accordance with an embodiment of the present invention.

As illustrated in FIG. 6, the present invention illustrates an exemplary method flow diagram [600] for updating the status information of the first SIM [112A] and the second SIM [112B] of the user equipment [110], wherein the status information indicates one of the availability and the unavailability of the first SIM [112A] and the second SIM [112B] in accordance with an embodiment of the present invention. The method flow [600] initiates at step 602 where the first SIM [112A] and second SIM [112B] may be registered on the network for the registration refresh expiry time. Also, the second SIM [112B] and the first SIM [112A] may be in the idle state and the first SIM [112A] and the second SIM [112B] may have one of the active data session and the passive data session.

At step 604, the I/O unit [142] of the network entity [140] may be configured to one of receive and initiate the first voice call from the first SIM [112A] of the user equipment [110].

At step 606, the I/O unit [114] may be configured to transmit the paging messages/instructions to the first SIM [112A] of the user equipment [110], wherein the first SIM [112A] may be configured to periodically receive paging messages/instructions for one of initiating and receiving the first voice call. Said I/O unit [114] may further be configured to check whether or not the second SIM [112B] of the user equipment [110] is in the active data session. In the event the second SIM [112B] of the user equipment [110] is in the active data session i.e. the user equipment [110] may receive data packets from the network entity [140] through the LTE network [130], the method [600] may lead to step 608. Alternatively, the method [600] may terminate at step 620.

At step 608, the deciding module [116], connected to the I/O unit [114], may be configured to suspend the data session of the second SIM [112B] of the user equipment [110] in an event the second SIM [112B] is in the active data session. Pursuant to suspending of the data session of the second SIM [112B], said deciding module [116] may also be configured to process the paging messages/instructions by inducing the time delay for enabling the allocation of the radio resources to the second SIM [112B], wherein the second SIM [112B] may now be connected to the network entity [140] while the first SIM [112A] for now, may not be connected to the network entity [140] for the specific time delay.

Thereafter, at step 610, the processing module [118] of the user equipment [110] may now allocate the radio resources to the second SIM [112B] for transmitting the status information to the network entity [140], wherein the status information may indicate unavailability of the second SIM [112B] for receiving the second voice call. In an embodiment, the status information may comprise the SIP PAUSE command and therefore, the network entity [140] may be aware of unavailability of the second SIM [112B] of the user equipment [110].

At step 612, said processing module [118] of the user equipment [110] may re-allocate the radio resources to the first SIM [112A] (earlier allotted to the second SIM [112B]) for establishing the voice connection for availing the first voice call, wherein the first SIM [112A] may be in the active state and the second SIM [112B] may be in the passive state. The method [600] may further lead to step 614 pursuant to disconnection of the voice connection on the first SIM [112A]. Alternatively, the method [600] may terminate at step 620.

At step 614, said processing module [118] of the user equipment [110] may be configured to allocate the radio resource to the second SIM [112B] for again transmitting the status information to the network entity [140], wherein the status information may now indicate availability of the second SIM [112B] for receiving the second voice call. In an embodiment, the status information may comprise the SIP RESUME command and therefore, the network entity [140] may be aware of the availability of the second SIM [112B]. Also, the present invention encompasses allocating of the radio resource to the first SIM [112A] and the second SIM [112B] for the pre-defined time period.

At step 616, the processing module [146] of the network entity [140] may be configured to transmit the acknowledging status to the user equipment [110] upon receiving the status information from the user equipment [110], wherein the status information may indicate availability of the second SIM [112B] for receiving the second voice call.

At step 618, at least one of the storage module [122] of the user equipment [110] and the storage module [148] of the network entity [140] may be configured to store and update the status information of the first SIM [112A] and the second SIM [112B] of the user equipment [110]. The method [600] may terminate at step 620, wherein the second SIM [112B] may now be enabled to initiate or receive a second voice call. Thus, both the SIMs i.e. the first SIM [112A] and the second SIM [112B] may again be in the ideal state.

Figure 7:
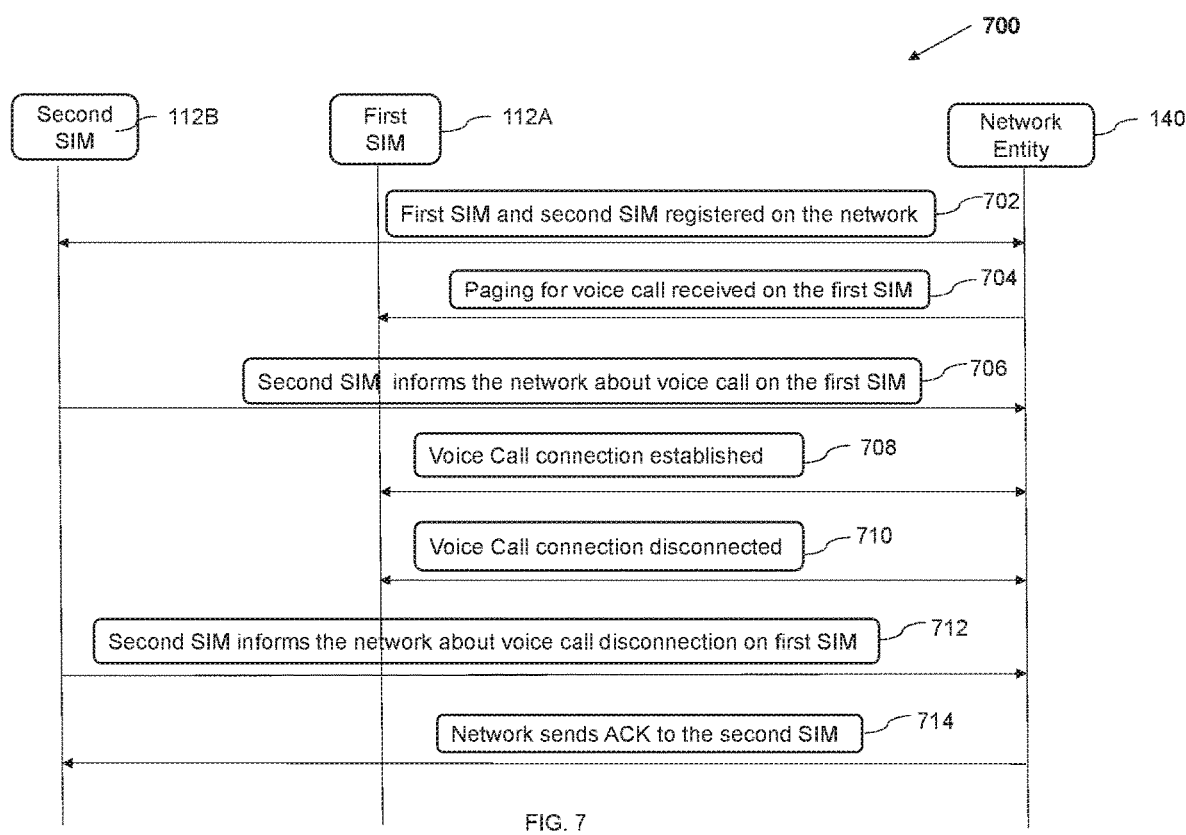
FIG. 7 illustrates an exemplary signalling diagram [700] relating to a call session for updating the status information at the network entity, in accordance with an embodiment of the present disclosure.

FIG. 7 illustrates an exemplary signalling diagram [700] relating to a call session for updating the status information at the network entity [140], in accordance with an embodiment of the present disclosure.

At step 702, the first SIM [112A] and second SIM [112B] of the user equipment [110] may initially be registered at the network for the registration refresh expiry time.

At step 704, the first SIM [112A] may periodically receive paging messages/instructions from the network entity [140] through the LTE network [130] for one of initiating and receiving the first voice call.

At step 706, the user equipment [110] may inform the un-availability of the second SIM [112B] of the user equipment [110] to the network entity [140].

At step 708, the first voice call may be established between the first SIM [112A] and the network entity [140] through the LTE network [130].

Further, at step 710, the connection established between the first SIM [112A] and the network entity [140] may be disconnected.

At step 712, the user equipment [110] may inform the availability of the second SIM [112B] of the user equipment [110] to the LTE network [130], thereby informing the network entity [140].

At step 714, the network entity [140], through the LTE network [130], may transmit the acknowledging status.

The present invention further encompasses an error handling scenario for processing of acknowledging a reason of no service of second SIM [112B] of the user equipment [110] in an event of on-going voice call on the first SIM [112A] according to various aspects of the invention as illustrated herein below:

In one instance, if the user equipment [110] transmits the SIP PAUSE command to the network entity [140] and further transmits the fresh register after sometime due to IMS Stack Crash/No Service Recovery/any other issues, the network entity [140] may override the existing SIP PAUSE process and accept said registration to register the user equipment entity [110] successfully. In another instance, if the user equipment entity [110] transmits the SIP PAUSE command to the network entity [140] and further SIP RESUME command may not be received for the pre-defined time due to some circumstances, the user equipment [110] may be declared as switched off and therefore, re-attach may be initiated and the IMS level re-registration may be triggered that may be achieved through a header field generally used in a SIP Request response. In yet another instance, if the user equipment [110] transmits SIP RESUME command to the network entity [140], however, no response may be received from the network entity [140], then the user equipment [110] may retire with help of an existing SIP retry mechanism to further re-register at the network. In yet another instance, the resume may be triggered by the user equipment [110] only within the registration refresh expiry time and if context is deleted by the user equipment [110], then the user equipment [110] may attempt for fresh registration.

Thus, the present disclosure encompasses a system [100] and method [600] for updating the status information of the first SIM [112A] and the second SIM [112B] of the user equipment [110] at the network entity [140]. Said method [600] and system [100] in turn improve Network KPIs for network subscribers with the multi-SIM DSDS wireless devices by providing the acknowledgement mechanism for the second SIM [112B] (i.e. the non-active SIM). Yet another object of the present invention may be to identify and solve the issue of network failure due to the active call on the first SIM [112A].

Though a limited number of the network entity [140] the user equipments [110, 150] and the components/sub systems therein, have been shown in the figures; however, it will be appreciated by those skilled in the art that the system [100] of the present disclosure encompasses any number and varied types of said entities/elements i.e. the network entity [140] the user equipments [110, 150], and the components/sub systems therein.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

We claim:

1. A method [600] for updating a status information of a first SIM [112A] and a second SIM [112B] of a user equipment [110] at a network entity [140], the method comprising:

one of receiving and initiating, by the network entity [140], a first voice call from the first SIM [112A], wherein the first SIM [112A] and the second SIM [112B] have one of an active data session and a passive data session, and the first SIM [112A] and the second SIM [112B] are in an ideal state;

suspending, by the user equipment [110], a data session of the second SIM [112B] in an event the second SIM [112B] is in the active data session;

allocating, by the user equipment [110], a radio resource to the second SIM [112B] for transmitting the status information to the network entity [140], wherein the status information indicates unavailability of the second SIM [112B] for receiving a second voice call;

allocating, by the user equipment [110], the radio resource to the first SIM [112A] for establishing a voice connection for availing the first voice call, wherein the first SIM [112A] is in an active state and the second SIM [112B] is in a passive state; and allocating, by the user equipment [110], the radio resource to the second SIM [112B] for transmitting the status information to the network entity [10], wherein the radio resource is allocated to the second SIM [112B] in an event the voice connection on the first SIM [112A] is disconnected, the status information indicates availability of the second SIM [112B] for receiving the second voice call, and the first SIM [112A] and the second SIM [112B] are in the ideal state.

2. The method [600] as claimed in claim 1, further comprising storing and updating the status information of the first SIM [112A] and the second SIM [112B] of the user equipment [110] at the network entity [140], the user equipment [110] and a combination thereof.

3. The method [600] as claimed in claim 1, further comprising transmitting an acknowledging status, by the network entity [140], on receiving the status information from the user equipment [110], wherein the status information indicates availability of the second SIM [112B] for receiving the second voice call.

4. The method [600] as claimed in claim 1, wherein the user equipment [110] is a dual SIM dual standby communication device.

5. The method [600] as claimed in claim 1, wherein the user equipment [110] receives data packets from the network entity [140] in the active data session.

6. The method [600] as claimed in claim 1, wherein the user equipment [110] does not receive data packets from the network entity [140] in the passive data session.

7. The method [600] as claimed in claim 1, wherein the first SIM [112A] and the second SIM [112B] are capable of receiving one of the first voice call and the second voice call in the ideal state.

8. The method [600] as claimed in claim 1, wherein the allocating the radio resource to the second SIM [112B] and the first SIM [112A] is for a pre-defined time period.

9. The method [600] as claimed in claim 1, wherein the active state indicates an ongoing voice call.

10. The method [600] as claimed in claim 1, wherein the passive state indicates no ongoing voice call and incapability of a SIM to receive any voice call.

11. A system [100] for updating a status information of a first SIM [112A] and a second SIM [112B] of a user equipment [110] at a network entity [140], the system [100] comprising:

the network entity [140] configured to one of receive and initiate a first voice call from the first SIM [112A], wherein
    the first SIM [112A] and the second SIM [112B] have one of an active data session and a passive data session, and
    the first SIM [112A] and the second SIM [112B] are in an ideal state;
the user equipment [110] configured to:
    suspend a data session of the second SIM [112B] in an event the second SIM [112B] is in the active data session;
    allocate a radio resource to the second SIM [112B] for transmitting the status information to the network entity [140], wherein the status information indicates unavailability of the second SIM [112B] for receiving a second voice call;
    allocate the radio resource to the first SIM [112A] for establishing a voice connection for availing the first voice call, wherein the first SIM [112A] is in an active state and the second SIM [112B] is in a passive state; and
    allocate the radio resource to the second SIM [112B] for transmitting the status information to the network entity [140], wherein
        the radio resource is allocated to the second SIM [112B] in an event the voice connection on the first SIM [112A] is disconnected,
        the status information indicates availability of the second SIM [112B] for receiving the second voice call, and
        the first SIM [112A] and the second SIM [112B] are in the ideal state.

12. The system [100] as claimed in claim 11, wherein at least one of the user equipment [110] and the network entity [140] is further configured to for store and update the status information of the first SIM [112A] and the second SIM [112B] of the user equipment [110].

13. The system [100] as claimed in claim 11, wherein the network entity [140] is further configured to transmit an acknowledging status on receiving the status information from the user equipment [110], wherein the status information indicates availability of the second SIM [112B] for receiving the second voice call.

* * * * *